US007194449B2

(12) United States Patent
Miao

(10) Patent No.: US 7,194,449 B2
(45) Date of Patent: Mar. 20, 2007

(54) METHOD AND SYSTEM FOR OPTIMIZING SNOW FLAKE QUERIES

(75) Inventor: Bingjie Miao, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 10/668,441

(22) Filed: Sep. 23, 2003

(65) Prior Publication Data

US 2005/0065939 A1   Mar. 24, 2005

(51) Int. Cl.
    *G60F 17/30* (2006.01)
(52) U.S. Cl. ............................... 707/2; 707/3; 707/102
(58) Field of Classification Search .................... None
    See application file for complete search history.

(56) References Cited

U.S. PATENT DOCUMENTS 5,848,408 A * 12/1998 Jakobsson et al. ............. 707/3
6,105,020 A *  8/2000 Lindsay et al. ................ 707/2
6,397,204 B1 *  5/2002 Liu et al. ...................... 707/2
6,516,310 B2 *  2/2003 Paulley ......................... 707/2
7,010,516 B2 *  3/2006 Leslie ........................... 707/2

OTHER PUBLICATIONS

Lightstone et al., "Toward Autonomic Computing With DB2 Universal Database", SIGMOND Record, vol. 31, No. 3, Sep. 2002, pp. 55-61.

* cited by examiner

*Primary Examiner*—Charles Rones
*Assistant Examiner*—Phuong-Thao Cao
(74) *Attorney, Agent, or Firm*—Lieberman & Brandsdorfer, LLC

(57) ABSTRACT

A method and system for optimizing a query in a snow flake schema (60) within a relational database. The schema (60) includes a fact table (12) and multiple dimension tables and a plurality of dimension levels, with at least one dimension table at each level. A logical node (310) comprised of a level one child dimension table (32) and all dimension tables (62) rooted at this level one child dimension table is created based upon the cumulative selectivity calculation for all of the dimension tables at each level of the database (210). Creation of the logical node reduces a snow flake schema to a star schema, thereby mitigating search space traversal.

17 Claims, 5 Drawing Sheets

METHOD AND SYSTEM FOR OPTIMIZING SNOW FLAKE QUERIES

BACKGROUND OF THE INVENTION

1. Technical Field

This invention relates to relational database systems. More specifically, the invention relates to optimizing snow flake queries.

2. Description of the Prior Art

Relational database systems store large amounts of data, including business data that can be analyzed to support business decisions. Data records in a relational database management system in a computing system are maintained in tables, which are a collection of rows all having the same columns. Each column maintains information on a particular type of data for the data records which comprise the rows. Keys can be defined on a column or set of columns if the column or set of columns can uniquely identify each row of the table. In particular, one primary key can be defined on each table, which represents the primary identifier for each row of the table. A foreign key can be defined on one table which refers to the primary key of another table. A table can have multiple foreign keys defined, each of which refers to the primary key of a different table. Two tables can be joined together via the primary key—foreign key relationship, wherein this join will bring information from these two tables together.

Organizations are known to archive data in a data warehouse, which is a collection of data designed to support management decision making. Data warehouses contain a wide variety of data that present a coherent picture of business conditions at a single point in time. One data warehouse design implementation is known as a "star schema", also known as multidimensional modeling. The basic premise of star schema is that information is classified into two groups, facts and dimensions. A fact table comprises the main database records concerning the organization's key transactions, such as sales data, purchase data, investment returns, etc. Dimensions are tables that maintain attributes about the data in the fact table. Each dimension table has a primary key column that corresponds to a foreign key column in the fact table.

The star schema provides a view of the database on dimension attributes that are useful for analysis purposes. This allows users to query on attributes in the dimension tables to locate records in the fact table. A query would qualify rows in the dimension tables that satisfy certain attributes or join conditions. The qualifying rows of the dimension tables have primary keys that correspond to foreign keys in the fact table. A join operation is then specified to qualify rows of the fact table. Typically, the primary key columns of the dimension tables are compared against the corresponding foreign key columns in the fact table to produce the results.

FIG. 1 is a prior art diagram (10) of a star schema. The schema is "star like" with a central fact table (12), and peripheral dimension tables (22), (32), and (42). The central fact table (12) includes sales data, wherein each record includes information on the amount sold in the AMOUNT column (20), the time of the sale in the TIME_ID column (14), the product sold in the PROD_ID column (16), and the geographic region of the sale in the NATION_ID column (18). The dimension tables (22), (32), and (42) provide attributes on the TIME_ID column (14), PROD_ID column (16), and NATION_ID column (18) in the fact table. The primary key columns of each of the dimension tables (22), (32), and (42) are the TIME_ID column (24), PROD_ID column (34), and NATION_ID column (44), respectively. The columns (14), (16), and (18) in the fact 25 table (12) are foreign keys that correspond to primary keys (24), (34), and (44) of the dimension tables (22), (32), and (42) that provide attributes on the data in the fact table (12). Accordingly, a join operation of the fact table (12) and the nation dimension table (42) with the NATION_ID as the join key will bring necessary information from the nation dimension table (42) together with information from the fact table (12).

A "snow flake schema" is an extension of the star schema where there can be multiple levels of dimension tables. FIG. 2 is a prior art diagram (60) of a snow flake schema. As in the star schema of FIG. 1, there is a central fact table (12), and peripheral dimension tables (22), (32), and (42). In addition, there is a second level of dimension tables (62) and (72) which provide attributes on the MANU_ID column (36) of dimension table (32) and the REGION_ID column (46) of dimension table (42). A level for a table in a snow flake schema is defined as the number of join operations it needs to reach the fact table. As shown in FIG. 2, the fact table is at level 0, dimension tables (22), (32), and (42) are at level 1, and dimension tables (62) and (72) are at level 2. The primary key columns of the second level dimension tables (62), (72) are the MANU_ID column (64) and REGION_ID column (74), respectively. Column (36) in table (32) and column (46) in table (42) are foreign keys that correspond to primary keys (64) and (74) of dimensional tables (62) and (72), respectively. Accordingly, a join operation of the second level dimension tables (62) and (72), with the first level dimension tables (32) and (42), followed by a join operation with the fact table (12) will bring information from the two levels of dimension tables together with information from the fact table (12).

The fact table in a relational database is the largest table in the structure. As such, processing the fact table is resource intensive when compared to processing other tables.

A query in a star schema or a snow flake schema usually has predicate filters on dimension tables and not on the fact table. A common technique for processing a query is to "push down" filter selectivity from dimension tables to the fact table. In a snow flake schema, filter selectivity from higher level dimension tables can be pushed down to the fact table via intermediate push down to lower level dimension tables. Predicate filters on a dimension table only select a subset of rows from the dimension table, and the technique of push down enables processing of only rows from the fact table corresponding to the qualifying rows from the dimension table. However, one must balance the cost of conducting a push down and the benefit of this push down to determine whether a push down from this dimension table to the fact table will be beneficial. The cost benefit analysis of conducting a push down depends on the selectivity of the predicate filter of the dimension table. A small selectivity indicates that a small number of rows will qualify based on this filter. Accordingly, the smaller the selectivity the dimension table has, the more beneficial it is to push down this filter selectivity to the fact table.

Much effort has been expended in developing optimization techniques for conducting queries in a snow flake schema. FIG. 3 is a prior art flow chart (100) illustrating a known method for a query in a snow flake schema. The initial step in the process is to input a query into the database (102). Following the input of the query into the database, a test is conducted to determine if the query is a snow flake query (104). If the query is not a snow flake query, an alternative optimization technique will be conducted (106).

However, if the query is a snow flake query, a level is assigned to each table in the query (108). The initial level for the query optimization process is set to one less than the maximum number of levels of tables in the query (110). Thereafter, for each table at the current level the following steps are followed (112): the current table is assigned as the parent table (114), and all child dimension tables are ordered for the current parent table based on selectivity (116). Following the ordering of the child dimension tables, for each child dimension table of the current parent table the following steps are followed (118): a test is conducted to determine if the child dimension table should be pushed down based on selectivity (120), a positive response to the test at step (120) will result in the marking of the child dimension table for push down (122), followed by a subsequent test to determine if the pushed down child dimension table is the last child dimension table of the current parent table (124). A negative response to the test at step (124) will result in proceeding to the next child dimension table for the current parent table (126) followed by a return to step (120). However, a positive response to the test at step (124) as well as a negative response to the test at step (120) will exit the loop initiated at step (118) and will result in a subsequent test to determine if the parent table acted upon at step (114) is the last table at the specified level in the query (128). A negative response to the test at step (128) will proceed to the next table at the current level (130) followed by a return to step (114). However, a positive response to the test at step (128) will result in proceeding to the next lower level in the query structure (132). Thereafter, a test is conducted to determine if the next lower level in the query structure is less than zero (134), which is an indication that all tables in the query have been exhausted. A negative response to the test at step (134) will return to step (112), whereas a positive response to the test at step (134) will complete the query optimization process (136). Accordingly, the above outlined process for a query optimization in a snow flake schema initiates the query optimization at the peripheral nodes of the query structure and proceeds toward the central node, also known as the fact table.

As shown in FIG. 3, the prior art method for query optimization in a snow flake schema conducts the node selection process for a query at the peripheral nodes. However, this method is not efficient in the selection process in that it requires selection of each child dimension table on an individual basis. Accordingly, what is desirable is a time and resource efficient system and method for optimizing a query in a snow flake schema.

SUMMARY OF THE INVENTION

This invention comprises a method and system for optimizing a query in a relational database having a snow flake schema.

In one aspect of the invention, a method is provided for optimizing a snow flake query. A logical node is created, wherein the logical node is comprised of a child dimension table and all dimension tables rooted at the child dimension table. Thereafter, it is determined if the logical node can be committed for push down to a fact table.

In another aspect of the invention, a system is provided to optimize a snow flake query. A fact table and at least two child dimension tables are provided, as well as a logical node comprised of a child dimension table and all dimension tables rooted at the child dimension table. An optimization module is provided to pledge the logical node for push down to the fact table.

In yet another aspect of the invention, an article is provided with a computer-readable signal-bearing medium. Means in the medium are provided for storing data in a relational database having a fact table and at least two child dimension tables. Means in the medium are also provided for creating a logical node comprised of the child dimension table and all dimension tables rooted at the child dimension table, and means in the medium are provided for determining commitment of the logical node for push down to the fact table.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Figure 1:
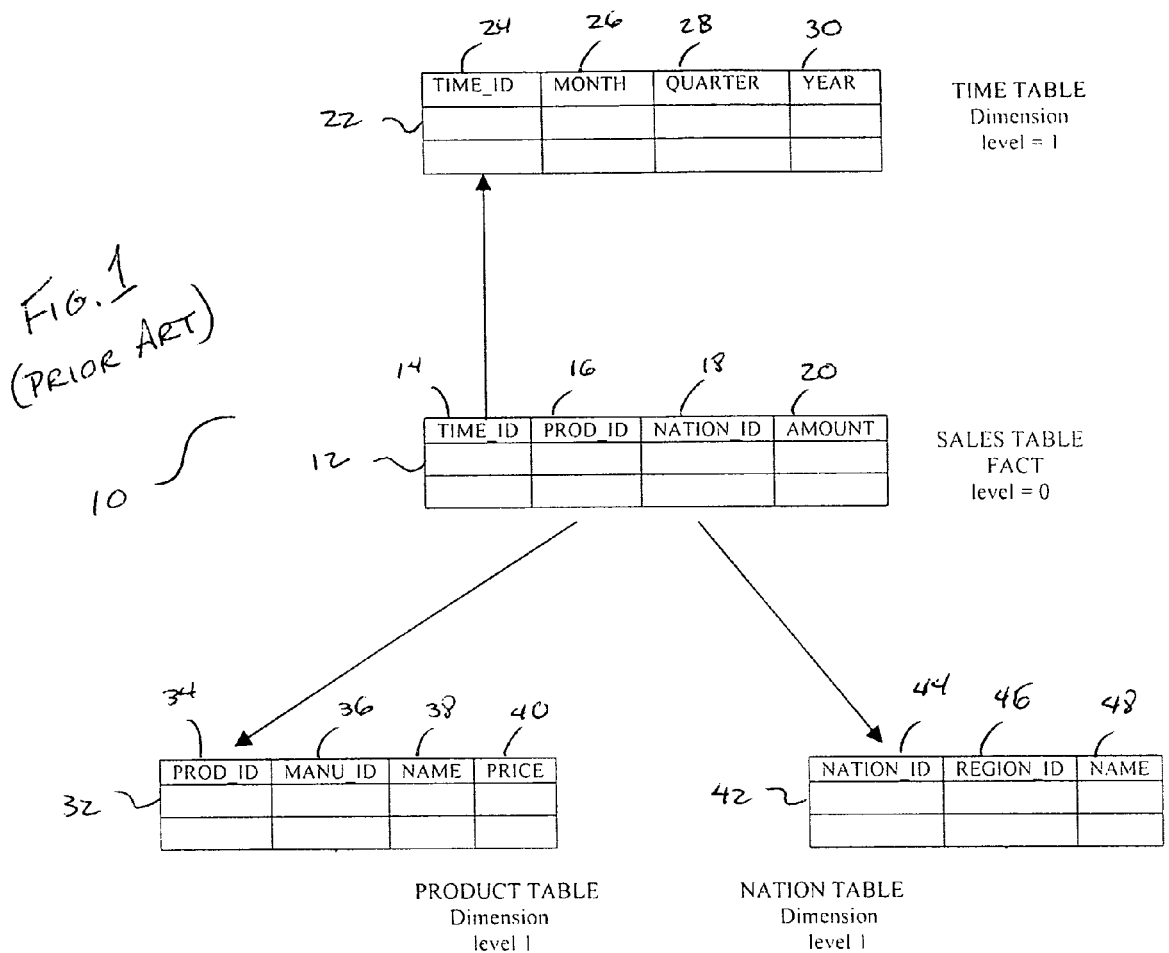
FIG. 1 is a block diagram of a prior art arrangement of database tables in a star schema.
Figure 2:
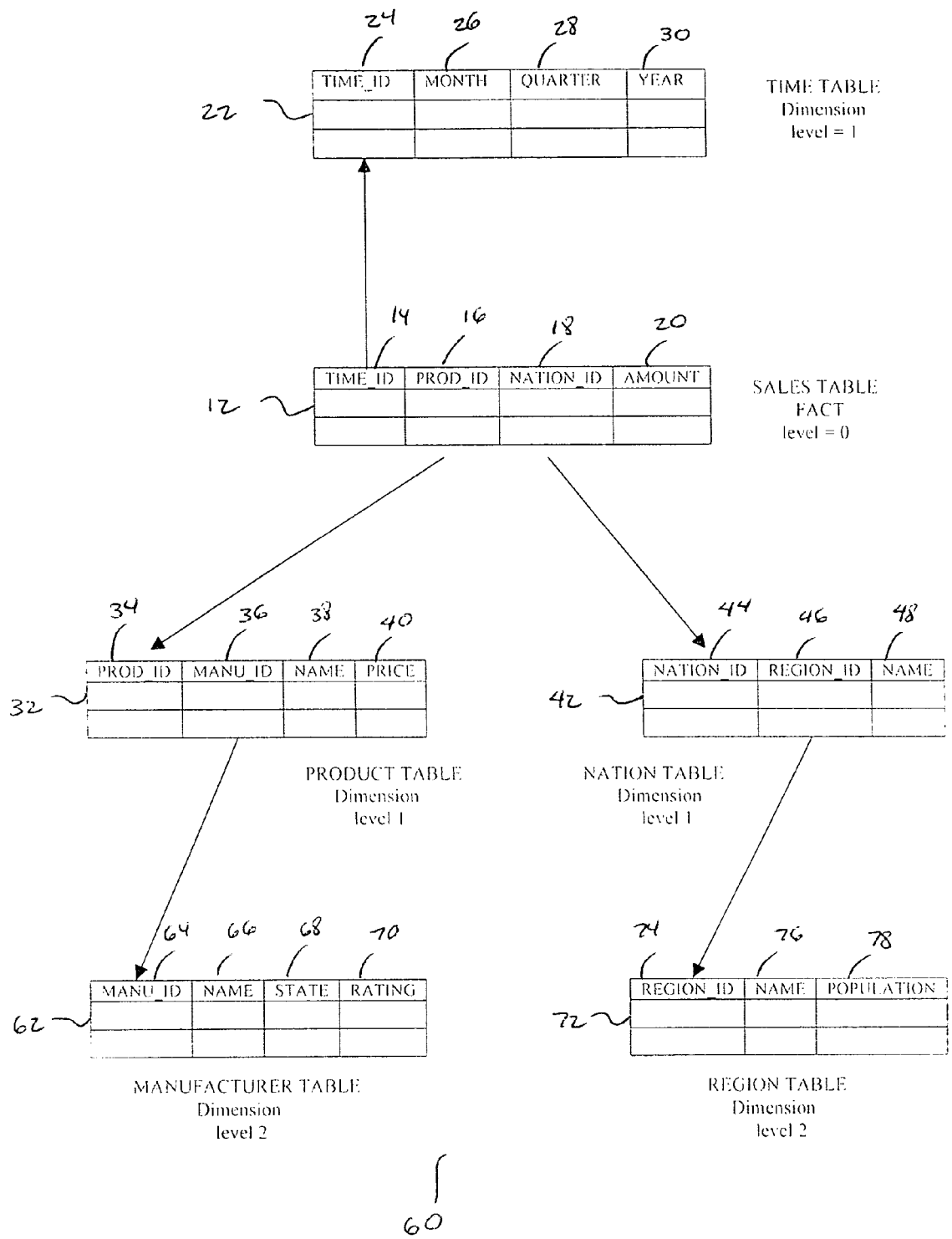
FIG. 2 is a block diagram of a prior art arrangement of database tables in a snow flake schema.
Figure 3:
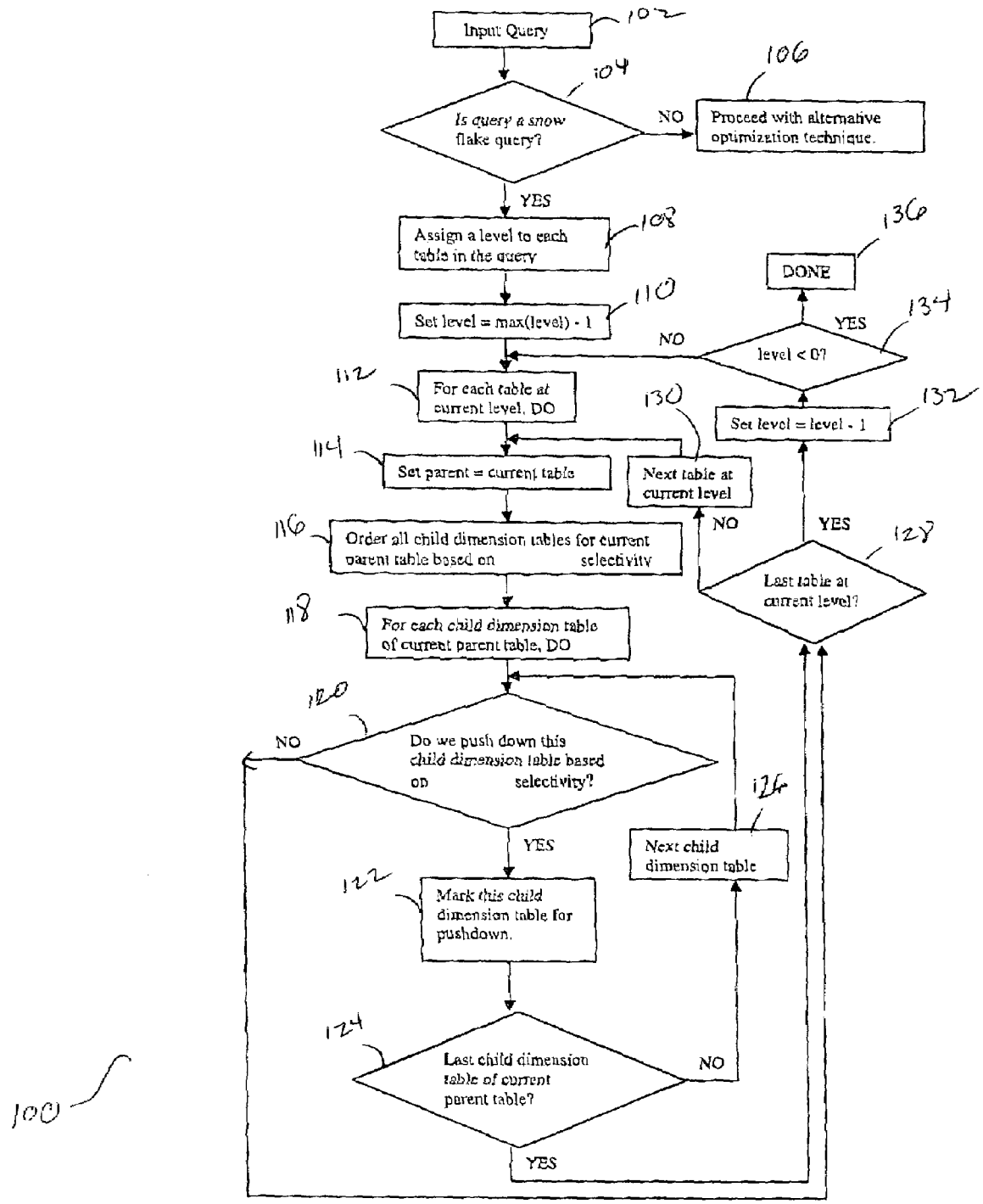
FIG. 3 is a flow chart illustrating a prior art query optimization process in a snow flake schema.

In a star schema within a relational database, a fact table and multiple dimension tables are provided with primary key columns and associated foreign key columns to enable communication between the tables. A snow flake schema, as shown in FIG. 2, is a known relational database structure of a plurality of dimension table levels. A logical node is created to encompass an identified child dimension table, and all further dimension tables that may be rooted at the identified child dimension table. The creation of the logical node mitigates search space traversal as commitment of a lower level child dimension table is inclusive of all dimension tables rooted at the committed lower level child dimension table.

Technical Details

Figure 4:
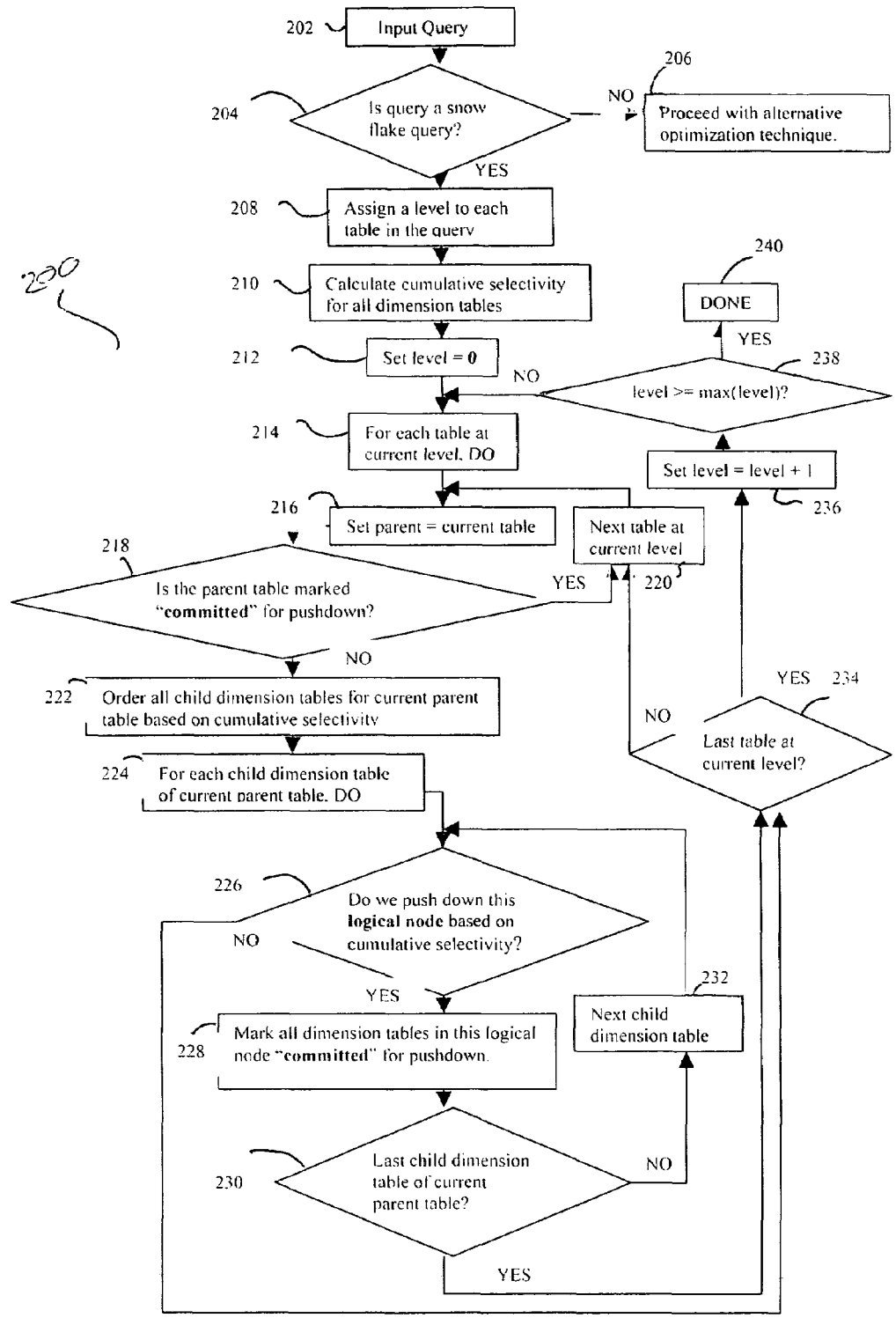
FIG. 4 is a flow chart illustrating a query optimization process in a snow flake schema according to the preferred embodiment of this invention, and is suggested for printing on the first page of the issued patent.

FIG. 4 is a flow chart (200) illustrating the process of optimizing a query in a relational database having a snow flake schema of a fact table and multiple levels of child dimension tables as shown in FIG. 2. The initial step in the process is to input a query into the database (202). Following the input of the query into the database, a test is conducted to determine if the query is a snow flake query (204). If the query is not a snow flake query, an alternative optimization technique will be conducted (206). However, if the query is a snow flake query, a level is assigned to each table in the query (208). Following assignment of levels to each table at step (208), a cumulative selectivity is calculated for all dimension tables at each level for all levels of the query (210). The cumulative selectivity calculation effectively creates a logical node comprised of a level 1 child dimension table, i.e. tables (22), (32) or (42) of FIG. 2, and all dimension tables rooted at this level 1 child dimension table, i.e. tables (62) or (72) of FIG. 2. The creation of these logical nodes effectively reduces a snow flake schema to a star schema, allowing algorithms for a star schema to be used at the logical node level. Accordingly, the first part of the optimization process includes calculating a cumulative selectivity for all dimension tables, leading to creation of logical nodes and subsequent reduction of a snow flake schema to a star schema.

Following the calculation at step (210) the level of the query optimization process is set to zero (212). As such, the query processing starts at the fact table. For each table in the current level (214) the parent table is assigned as the current table (216). Following the assignment at step (216), a test is conducted to determine if the parent table is marked as committed for push down to the fact table (218). A positive response to the test at step (218) will follow in a selection of a subsequent table at the same level (220), and skip the remainder of the processing steps for this parent table. However, a negative response to the test at step (218) will result in an ordering of all the child dimension tables for the current parent table based on the cumulative selectivity (222) obtained at step (210). In an example where the current table is the same as the fact table, the response to the test at step (218) would always be negative. Alternatively, the test in step (218) could be skipped when the current table is the same as the fact table. Following the ordering of all child dimension tables for the current parent table at step (222), each child dimension table must proceed through the following three steps (224): first, a test is conducted to determine whether the logical node rooted at this child dimension table should be pushed down to the fact table based upon the cumulative selectivity calculation (226), second, a positive response to the test at step (226) will result in all dimension tables in this logical node being marked as committed for push down to the fact table (228), and third, a subsequent test is conducted to determine if the child dimension table in question is the last child dimension table of the current parent table (230). At step (226), the determination of push down includes consideration of previously committed logical nodes for push down to the fact table so that only an optimal quantity of logical nodes are committed for push down to the fact table. A negative response to the test at step (230) will result in the query optimization process proceeding to the next child dimension table of the current parent table (232), followed by a return to step (226). However, a positive response to the test at step (230) as well as a negative response to the test at step (226) will complete the loop initiated at step (224). Thereafter, a subsequent test is conducted to determine if the current parent table is the last table to be tested at the current assigned level of the query optimization process (234). A negative response to the test at step (234) will proceed to step (220) and the selection of the next table at the current assigned level of the query optimization process. However, a positive response to the test at step (234) will result in incrementing the assigned level in the query structure to continue the query optimization process at the next level of dimension tables (236). Thereafter, a final test is conducted to determine if the incremented level from step (236) is greater than or equal to the maximum number of levels in the query structure (238). A negative response to the test at step (238) will result in a return to step (214), and a positive response will result in completion of the query optimization process (240). Accordingly, the optimization technique shown in FIG. 4 proceeds through each level of the query structure starting at the central fact table and proceeding through each subsequent level of child dimension tables.

As previously mentioned, the creation of logical nodes effectively reduces a snow flake schema to a star schema. Therefore, all decisions as to whether to push down to the fact table are made in the process of iterating through level 1 child dimension tables. This is accomplished with the current level of the query optimization set to 0 in the optimization technique shown in FIG. 4, where the fact table is the parent table being considered in the first iteration. Subsequent processing where the current level of the query optimization process is greater than zero is only necessary if partial push down is desired. A partial push down happens when filter selectivity from a higher level dimension table is pushed down to a lower level dimension table, but not to the fact table. Using the schema depicted in FIG. 2, an example of partial push down is when the filter selectivity from table (62) is pushed down to table (32), but there is no push down from table (32) to the fact table (12). Accordingly, when a partial push down is considered, all dimension tables that have been marked as committed for push down to the fact table can be passed over.

Figure 5:
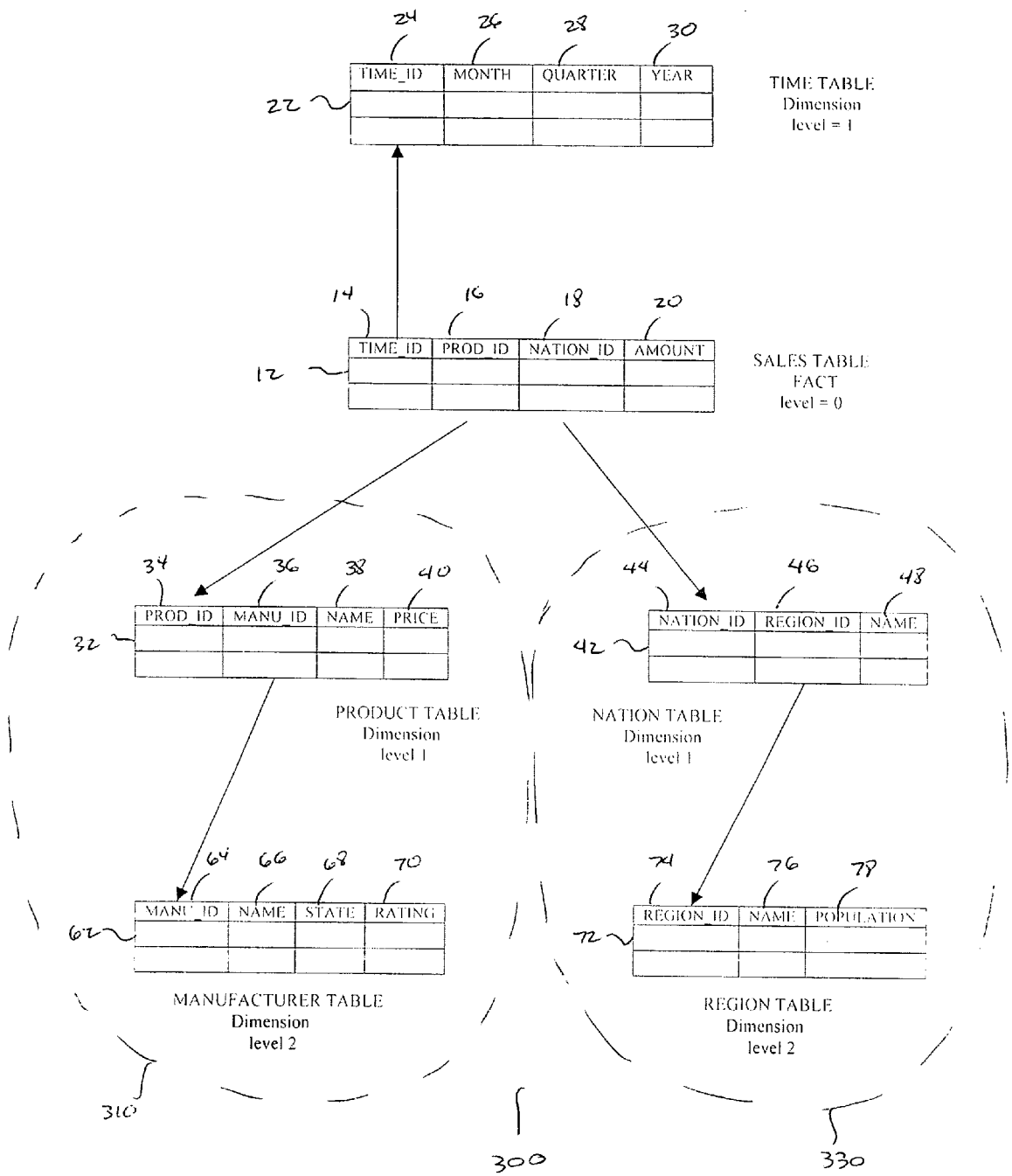
FIG. 5 is a block diagram of an arrangement of database tables in a snow flake schema with two logical nodes.

As illustrated in the optimization technique shown in FIG. 4, the decision of whether to push down to the fact table is made for each logical node. FIG. 5 is a block diagram (300) illustrating the fact table (12), a first level dimension table (22), and two logical nodes (310) and (330). Logical node (310) is comprised of the first level dimension table (32) and the second level dimension table (62), while logical node (330) is comprised of the first level dimension table (42) and the second level dimension table (72). The process of marking table (32) for push down to the fact table (12) incorporates all child dimension tables rooted at table (32), and in this example it is only table (62) as there are no other tables rooted at either tables (32) or (62). However, if there was a third level child dimensional table rooted at table (62), this table would be incorporated into logical node (310) and marked for push down to the fact table (12). Similarly, the process of marking table (42) for push down to the fact table (12) incorporates all child dimension tables rooted at table (42), and in this example it is only table (72) as there are no other tables rooted at either tables (42) or (72). The process of creating a logical node incorporates all decision making at the logical node level, i.e. at the dimension level of the lowest level table in the logical node. Once a logical node is committed for push down to the fact table, no further decision is required for any table within the logical node in subsequent query processing steps. Accordingly, the query optimization process incorporates multiple levels of tables into a logical node for push down to the fact table.

Advantages Over the Prior Art

The process of creating a logical node that incorporates tables rooted at the selected child node mitigates search space traversal by the optimization module. The calculation of cumulative selectivity that includes all selectivities from dimension tables rooted at the selected child dimension table enables the creation of a logical node. Once a logical node is committed for push down to the fact table, the search optimization process ceases consideration of any sub-tables related to the senior child dimension table for further push down considerations. Accordingly, the creation of a logical node mitigates the search space required for traversal by the optimization module.

Alternative Embodiments

It will be appreciated that, although specific embodiments of the invention have been described herein for purposes of illustration, various modifications may be made without departing from the spirit and scope of the invention. In particular, the concept of push down in the preferred embodiment is meant to include any method or mechanism for reduction of processing of the fact table based upon reduction of processing of dimension tables. In addition, the use of selectivity and cumulative selectivity in the preferred embodiment includes any metrics used in the decision for push down to the fact table, either individually or in a collective manner. The concept of creation of a logical node is therefore not restricted to the calculation of cumulative selectivity, rather it includes any combination of metrics from all dimension tables within the logical node. Accordingly, the scope of protection of this invention is limited only by the following claims and their equivalents.

I claim:

1. A method for optimizing a snow flake query comprising:
    organizing a database stored on a computer readable medium with a fact table and multiple dimension tables into a snow flake configuration;
    reducing the snow flake configuration to a star configuration by combining a first generation child dimension table rooted at the fact table and all subsequent dimension tables rooted at said first generation child dimension table into a logical node;
    determining commitment of said logical node for push down to a fact table for execution of a query;
    pushing down said logical node to said fact table responsive to a positive commitment, wherein the step of pushing down said logical node to said fact table includes each dimension table rooted at said first generation child dimension table in said logical node; and
    displaying query results to a user.

2. The method of claim 1, wherein the step of determining commitment of said logical node for push down to said fact table includes committing an optimal number of logical nodes for push down to said fact table.

3. The method of claim 1, wherein the step of determining commitment of said logical node for push down to said fact table includes calculating a cumulative selectivity for said logical node.

4. The method of claim 3, wherein the step of calculating a cumulative selectivity for said logical node includes a representation of all selectivities from all dimension tables in said logical node.

5. The method of claim 1, wherein the step of determining commitment of said logical node for push down to said fact table excludes a dimension table in said logical node from further consideration.

6. A computer system comprising:
    a processor in communication with storage media;
    said storage media having a database with a fact table and at least two child dimension tables, said fact table and said child dimension tables organized into a snow flake configuration;
    a logical node in said database to reduce said snow flake configuration of said tables to a star configuration, said logical node comprised of a first generation child dimension table rooted at the fact table with all subsequent generation dimension tables rooted to said child dimension table; and
    an optimization module in communication with said processor and said logical node, said optimization module adapted to push down said logical node to said fact table for execution of a query of said database, wherein optimization module includes each dimension table rooted at said first generation child dimension table in said logical node.

7. The system of claim 6, wherein said optimization module is adapted to commit an optimal number of logical nodes for push down to said fact table.

8. The system of claim 6, wherein creation of said logical node reduces a snow flake schema to a star schema.

9. The system of claim 6, wherein said optimization module comprises means for calculation of a cumulative selectivity for said logical node.

10. The system of claim 9, wherein said calculation means includes a representation of all selectivities for all dimension tables in said logical node.

11. The system of claim 6, wherein said logical node reduces search space traversal.

12. An article comprising:
    a computer-readable medium;
    means in the medium for storing data in a relational database having a fact table and at least two child dimension tables, wherein said tables are organized in a snow flake configuration;
    means in the medium for reducing the snow flake configuration to a star configuration by combining a first generation child dimension table rooted at the fact table and all subsequent dimension tables rooted at said first generation child dimension table into a logical node;
    means in the medium for determining commitment of said logical node for push down to said fact table for execution of a query; and
    means for pushing down said logical node to said fact table responsive to a positive commitment, wherein said means for pushing down said logical node to said fact table includes each dimension table rooted at said first generation child dimension table in said logical node.

13. The article of claim 12, wherein the medium is a recordable data storage medium.

14. The article of claim 12, wherein said means for determining commitment of said logical node for push down to said fact table includes committing an optimal quantity of logical nodes for push down to said fact table.

15. The article of claim 12, wherein said means for determining commitment of said logical node for push down to said fact table includes means for calculating a cumulative selectivity for said logical node.

16. The article of claim 15, wherein said means for calculating a cumulative selectivity for said logical node includes a representation of all selectivities for all dimension tables in said logical node.

17. The article of claim 12, wherein said means for determining commitment of said logical node for push down to said fact table includes mitigation of search space traversal.

* * * * *